June 30, 1953   F. P. LENARD ET AL   2,643,593
METHOD OF PRODUCING MULTIPLY METAL-FOIL-CARDBOARD MATERIAL
AND OF PRODUCING ARTICLES FORMED OF SUCH MATERIAL
Filed Oct. 30, 1948   2 Sheets-Sheet 1

F. P. Lenard & G. W. Methven
By Fraser, Myers & Manley
Attys

June 30, 1953           F. P. LENARD ET AL          2,643,593
METHOD OF PRODUCING MULTIPLY METAL-FOIL-CARDBOARD MATERIAL
AND OF PRODUCING ARTICLES FORMED OF SUCH MATERIAL
Filed Oct. 30, 1948                         2 Sheets-Sheet 2

F. P. Lenard & G. W. Methven.
By Fraser, Myers & Manley
Attys.

Patented June 30, 1953

2,643,593

UNITED STATES PATENT OFFICE 2,643,593

METHOD OF PRODUCING MULTIPLY METAL-FOIL-CARDBOARD MATERIAL AND OF PRODUCING ARTICLES FORMED OF SUCH MATERIAL

Frederick Pyne Lenard and Geoffrey William Methven, London, England, assignors to The New Merton Board Mills Limited, London, England, a company of Great Britain and Northern Ireland Application October 30, 1948, Serial No. 57,524
In Great Britain November 5, 1947

8 Claims. (Cl. 93—55.1)

The present invention relates to articles made of a plurality of plies of cardboard or paper or the like (hereinafter referred to as cardboard) adhesively bonded together and methods of making such articles. As the dividing line, if any, between cardboard and paper is indefinable, and as the terms "cardboard" and "paper," heretofore, have commonly been used interchangeably, the term "cardboard" has been employed in a broad sense in the present specification and in the accompanying claims, to refer to either cardboard or paper.

It is known that metal foil can be bonded to cardboard by an adhesive of the thermo-setting type such as a starch paste-urea formaldehyde resin so as to withstand the direct contact of steam without peeling off. Since the machines for lining cardboard and the like with metal foil are very delicate owing to the extreme thinness of the foil used, it is not possible to use an adhesive which cannot always be redissolved in a solvent, since such adhesive cannot readily be cleaned off the machines after use. It is, in fact, necessary to use an adhesive which is always liquid soluble so that the lining machines may be cleaned down after use. The starch-paste-urea formaldehyde adhesive above mentioned has commonly mixed with it a little ammonium chloride as a hardening agent, so that it hardens at room temperature in 2-3 days and, in thin layers, in a considerably shorter time, thus making it completely unsuitable for this purpose.

It is an object of the present invention to produce articles of multi-ply cardboard and foil which can be brought into direct contact with steam without peeling of the foil.

According to the present invention a method of making multi-ply metal foil cardboard material comprises forming a composite web of cardboard and metal foil adhesively joined by means of a liquid soluble adhesive, said liquid soluble adhesive being convertible to a water insoluble complex by treatment with formaldehyde, bonding two or more layers of the composite web together by means of a thermo-setting adhesive containing an excess of formaldehyde. The material thus produced may be heated to liberate formaldehyde, which permeates the cardboard and renders said liquid soluble adhesive water insoluble. Alternatively the material may be seasoned at room temperature and both adhesives will become insoluble after a few days; heating serves only to accelerate setting.

The adhesive for adhering the metal foil and cardboard together may conveniently be a casein adhesive and the second adhesive may be a thermo-setting adhesive containing urea-formaldehyde. On the application of heat, formaldehyde permeates the cardboard and condenses with the casein to form a thermo-setting substance.

In the composite web above referred to a single web of metal foil only may be used, but two webs of cardboard may be employed, both surfaces of the metal foil being adhered to cardboard.

It is known to construct a container having a cylindrical body of several plies of cardboard adhesively bonded together and a container of considerable strength may be formed in this way, which still has walls of considerable flexibility.

It is an object of the present invention to provide a container of multi-ply cardboard construction for the vacuum packing of food which may be of a larger size than the tin can normally used for this purpose.

In the normal system of vacuum packing of food the cans are filled and sealed and are then heated to 120° C. for sterilisation in a pressure cooker in which an exterior pressure may be applied to the cans greater than the pressure inside the can generated by heating. On cooling, a considerable vacuum occurs inside the can and if the can is of large size such as would be required for a capacity of 56 lbs., there is a tendency to collapse, unless the can is made of heavier gauge metal than used for the normal 1 lb. cans. The use of a heavy gauge metal introduces many complications and it has not been practicable to use a can of large capacity.

A drum, according to a further feature of the invention, comprises a convolutely wound cylindrical body portion and separately formed metal end pieces engaging the ends of said body portion, said convolutely wound body portion comprising a plurality of layers of metal foil and cardboard adhesively bonded together by means of a water insoluble adhesive. The end pieces will preferably be formed of a metal such as aluminium which is relatively inert to food acids, the top end piece being formed with a vacuum closure of any convenient design.

The invention is illustrated with reference to the accompanying drawings wherein.

Figures 1, 2:
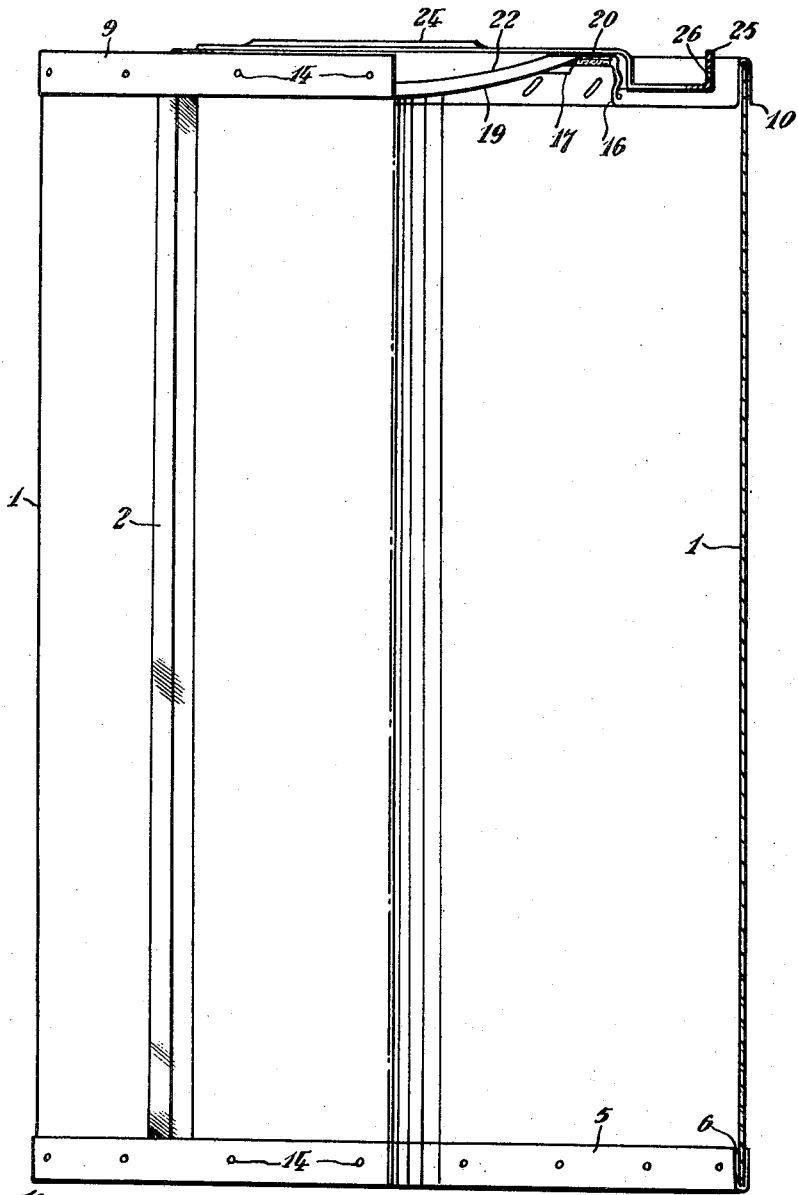
Fig. 1 shows an elevation of a drum partly in section.
Fig. 2 shows a sectional detail of the vacuum closure for the drum.
Figure 3:
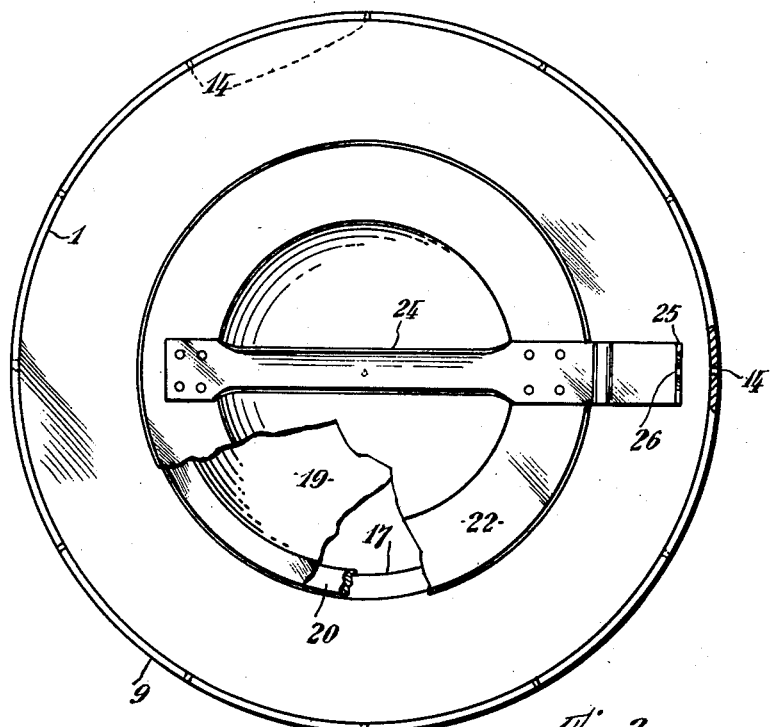
Fig. 3 shows a plan view of the top of a drum.

One application of the present invention is for the production of a 56 lb. container for vacuum packing of fruit pulp or similar substances and is illustrated with reference to Figs. 1–4.

A continuous web of cardboard of .016 inch thickness is lined in a lining machine with aluminium foil of .0005 inch thickness, the cardboard and the aluminium being caused to adhere together by means of a liquid soluble casein adhesive. If the composite web at this stage is brought into direct contact with steam or hot water, the aluminium foil quickly peels off from the cardboard.

The composite web in roll form is then transferred to a coiling machine having a collapsible motor-driven rotatable mandrel. The composite web is fed from the roll over a heated roller and is then brought into contact with an adhesive transfer roller, which applies a coating of adhesive to the cardboard side of the composite web and then on to the rotatable mandrel.

One turn of the composite web with the aluminium foil on the inside is made round the mandrel which is turned by hand for this operation. The web is then cut off so as to leave a small overlap, so disposed that when the free end of the composite web roll, foil-side outward, is adhesively attached to the overlapping portion, the web runs in the same direction as before, so that on starting the mandrel drive, the tension of the web tightens the first turn of composite material on to the mandrel.

The machine is so arranged that the web is maintained under tension by means of a brake mechanism on the web spool, in order to keep each turn of the web tight on the mandrel. It is also provided with an automatic cut-off on the mandrel drive so that after a predetermined number of rotations the motor stops automatically. The web is then severed. In the present example, ten turns of composite web are used to form the cylindrical coils.

The paste used in conjunction with the coiling machine is composed in the proportion of 30 lbs. starch-flour paste made up with 30 lbs. of water and 28 lbs. urea-formaldehyde, to which ammonium chloride is added as a hardening agent.

The cylindrical coil is removed from the coiling machine and is then stood on end for 5–10 minutes, during which time it becomes sufficiently stiff to handle. The cylinders are then transferred to a trimming machine, in which the edges are cut back, since there is a certain amount of wandering in the coiling machine, and the cylinder is divided centrally to provide two bodies for the complete container. From this it follows that the original web must be rather wider than twice the height of the body of the finished container.

The cylindrical bodies 1 are removed from the trimming machine and are then stood for 15–30 minutes over infra-red lamps to set and dry the paste, the bodies 1 being roughly closed by placing a sheet of asbestos over the top. Temperature measurements taken during the drying showed a temperature of 104° C. at the top of the drum and of 88° C. at the bottom of the drum.

During this drying there is a considerable evolution of formaldehyde from the adhesive and this passes through the cardboard and reacts with the casein adhesive used to join the foil to the cardboard to form a new adhesive which is capable of withstanding direct contact with steam.

After removal from the infra-red lamps the vertical seams on the cylinder are sealed by applying a strip 2 of .001 inch aluminium foil of a width of about one inch on the outside and a similar strip 3 on the inside (see Fig. 4); the foil is affixed by the application of a heat-sealing nitrocellulose adhesive, which is then set by applying a hot iron along the seams.

The body 1 is then passed to a machine, in which a separately formed aluminium alloy bottom end piece 5 is pressed on, the end piece being formed with a deep annular recess 6 adapted to receive the edge of the cylindrical body 1.

The inside of the assembly is then sprayed with nitro-cellulose clear lacquer.

A separately formed top end piece 9, of which the inside has already been sprayed with lacquer, is then pressed onto the cylindrical body, which engages with an annular recess 10 in the top end piece.

The body 1 is then sprayed on the outside with cellulose lacquer and is then stood over an infra-red lamp, bottom up, for 15–20 minutes to dry the lacquer.

The purpose of the lacquer spraying is to keep the food acids of the contents of the container away from the metal, since, though the metal is relatively inert to food acids, there may be some corrosion.

After removal from the lamps the walls of the annular recesses 6 and 10 of the top and bottom end pieces are drilled and the two end pieces are attached to the cylindrical body 1 by hollow rivets 14 at each end.

The top end piece 9 is formed from a single aluminium alloy pressing. In addition to the annular recess formed near the periphery, the end piece is formed with an opening for filling, adapted to be closed by a vacuum seal. Around the opening is provided a multiple threaded vertical portion 16 and an overhanging annular horizontal portion 17, adapted to be engaged by a similar annular horizontal portion on a dished sealing cover 19, a suitable sealing washer 20 being placed between the two. The closure is completed by a locking cover 22, provided with a peripheral flange formed with multiple threads adapted to engage the threads on the vertical portion 17. The locking cover 22 is provided with a handle 24 for lifting purposes and the said handle is provided with a projecting portion 25 which extends nearly to the edge of the container. The projecting portion is formed with a small aperture 26, through which a wire may be passed and through an adjacent hollow rivet 14 to form a seal against accidental opening of the container.

The dimensions of the completed drum of 56 lbs. capacity is 10½" diameter x 17" length.

It should be noted that other water soluble glues may be used to replace casein adhesives, since casein is not the only water soluble substance used in adhesives to be rendered insoluble by formaldehyde. For instance it is well known that gelatinous glues can be hardened by formaldehyde.

To give one example of a vacuum packing process to which the container so constructed can be used, a container was filled with fruit pulp at a temperature of 80° C.–90° C. It was then closed by means of the sealing cover 19 and the locking cover 22 was screwed down. The filled container was then placed in a pressure cooker and heated to 120° C. to sterilise the fruit pulp, the pressure on the outside of the container being maintained slightly greater than the pressure on the inside, exerted by the hot contents.

After about 35 minutes cold water was sprayed on to the container and after an initial cooling the container was removed from the pressure cooker and was allowed to cool in the open, which took about 24 hours, during which time a considerable vacuum developed inside the container through the contraction of the contents on cooling. There was no tendency for the container to collapse on cooling.

In this way a container for vacuum packing of food, which is sterilised in the container, can be simply and easily produced. A container produced in this way can be used five or six times before being discarded and has a definite advantage over the normal can, which may only be used once.

By use of the present invention a composite board may be produced which has good water resisting and insulating properties. Two composite webs of cardboard and aluminium foil, produced as in the previous instance, are bonded together with their cardboard surfaces inwards in a laminating machine by means of starch paste-urea formaldehyde adhesive applied to the cardboard surface of one of the webs, and the laminated board is cut off into lengths and stacked. It is not heat treated, but, instead, is left for about 14 days, in which time the urea formaldehyde adhesive has set and sufficient gaseous formaldehyde has permeated the cardboard to set the casein adhesive and render it water insoluble.

Figure 5:
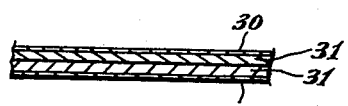
Fig. 5 shows a board made in accordance with an alternative form of the present invention.
Figure 4:
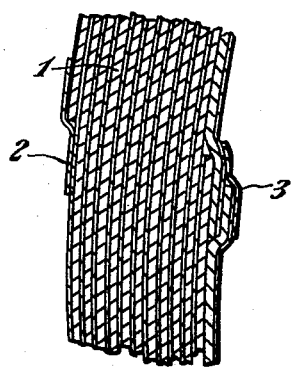
Fig. 4 shows an enlarged section detail of the wall of a drum.

The board produced by this means is shown in Fig. 5, in which the aluminium foil plies 30 are on the outside and the cardboard plies 31 are between them.

A board thus formed has good heat insulating properties, as the aluminium foil acts as a reflector of radiant heat and the cardboard acts as an insulator for conducted heat. The foil also forms an impermeable layer for the protection of the cardboard, so that a board made in this way may be washed down with water without damage.

What we claim and desire to secure by Letters Patent is:

1. A method of producing multi-ply metal-foil-cardboard material comprising first forming a composite web of cardboard permeable by formaldehyde and an impermeable metal foil by adhesively joining the two in face-to-face relationship by means of a liquid soluble adhesive which is convertible to a water insoluble complex by treatment with formaldehyde, then applying precondensed formaldehyde resin adhesive containing uncondensed formaldehyde to the then exposed face of the cardboard, and then subjecting the composite web to temperature conditions for a duration of time dependent upon such temperature; the time being of relatively long duration in the presence of relatively low temperatures such as room temperatures and of relatively shorter duration in the presence of relatively higher temperatures.

2. A method of producing multi-ply metal-foil-cardboard material comprising first forming a composite web of cardboard permeable by formaldehyde and an impermeable metal foil by adhesively joining the cardboard and the metal foil in face-to-face relationship by means of a water soluble adhesive which is convertible to a water insoluble complex by treatment with formaldehyde, then bonding cardboard and metal foil faces of such composite web together by means of a precondensed formaldehyde resin adhesive containing uncondensed formaldehyde and seasoning by storage the laminated material thus produced to thus convert said water soluble adhesive by penetration of the formaldehyde through the cardboard.

3. A method of producing multi-ply metal-foil cardboard laminae adhesively bonded together comprising first forming a composite web of cardboard permeable by formaldehyde and an impermeable metal foil by adhesively joining the cardboard and the metal foil in face-to-face relationship by means of a water soluble adhesive including casein, bonding cardboard and metal foil faces of such composite web together by means of a precondensed formaldehyde resin adhesive containing uncondensed formaldehyde, and heating the laminae to liberate formaldehyde from said second adhesive to set said casein containing adhesive by penetration of the formaldehyde through the cardboard and to harden said formaldehyde resin adhesive.

4. A method of producing multi-ply metal-foil-cardboard material comprising first forming two composite webs of cardboard permeable by formaldehyde and an impermeable metal foil by adhesively joining the two cardboard and the metal foil for each web in face-to-face relationship by means of a water soluble adhesive which is convertible to a water insoluble complex by treatment with formaldehyde, coating the cardboard surface of at least one of said composite webs with a precondensed formaldehyde resin adhesive containing uncondensed formaldehyde, bonding said webs to each other so that the cardboard surfaces of the two composite webs are in intimate face-to-face association and the metal foil surfaces of both of said composite webs face outwardly, and seasoning by storage the laminated material thus produced to thus convert said water soluble adhesive by penetration of the formaldehyde through the cardboard.

5. A method of producing multi-ply metal-foil-cardboard cylindrical drum bodies comprising first forming a composite web of cardboard permeable by formaldehyde and an impermeable metal foil by adhesively joining the two in face-to-face relationship by means of a liquid soluble adhesive which is convertible to a water insoluble complex by treatment with formaldehyde, drawing said composite web from a reel, applying a precondensed thermosetting formaldehyde resin containing uncondensed formaldehyde adhesive continuously to at least one side of said composite web, tightly coiling said adhesively coated web into a cylinder, thereby bringing the cardboard and metal foil surfaces of the composite web into intimate face-to-face association with the latter adhesive therebetween and in contact with both such surfaces, cutting off said web after a predetermined number of turns and heating the cylindrical body so formed to liberate formaldehyde from said second adhesive to thus convert said first adhesive by penetration of the formaldehyde through the cardboard and harden said second adhesive.

6. A method of producing multi-ply metal-foil-cardboard containers comprising first forming a composite web of an impermeable metal foil and cardboard permeable by formaldehyde by adhesively joining the two in face-to-face relationship by means of a water soluble adhesive which is convertible to a water insoluble complex by treatment with formaldehyde, coating the cardboard surface of the composite web with a precondensed formaldehyde resin adhesive containing uncondensed formaldehyde, coiling and bonding the web with its metal-foil surface inwardly, severing the web, continuing coiling and bonding the web with the metal-foil surface outwardly on the core so formed, severing the web after a predetermined number of turns, heating the cylindrical body so formed to harden the precondensed formaldehyde resin adhesive and to liberate formaldehyde to thus convert the water soluble adhesive by penetration of the formaldehyde through the cardboard and applying separate metal pieces to form the end closures of the container.

7. A method of producing multi-ply metal-foil-cardboard material comprising first forming a composite web of cardboard permeable by formaldehyde and an impermeable metal foil by adhesively joining the two in face-to-face relationship by means of a liquid soluble adhesive which is convertible to a water insoluble complex by treatment with formaldehyde, then bonding a second piece of cardboard adhesively to the then exposed cardboard face of the composite web by means of a precondensed formaldehyde resin adhesive containing uncondensed formaldehyde, and then subjecting the resulting composite web to temperature conditions for a duration of time dependent upon such temperature; the time being of relatively long duration in the presence of relatively low temperatures such as room temperatures and of relatively shorter duration in the presence of relatively higher temperatures.

8. A method of producing multi-ply metal-foil cardboard material comprising first similarly forming two separate composite webs of cardboard permeable by formaldehyde and an impermeable metal foil by adhesively joining a sheet of such cardboard and a sheet of such metal foil in face-to-face relationship by means of a liquid soluble adhesive which is convertible to a water insoluble complex by treatment with formaldehyde, then bonding the two composite webs together with their cardboard faces in face-to-face relationship by means of a precondensed formaldehyde resin adhesive containing uncondensed formaldehyde, and then subjecting the joined composite webs to temperature conditions for a duration of time dependent upon such temperature; the time being of relatively long duration in the presence of relatively low temperatures such as room temperatures and of relatively shorter duration in the presence of relatively higher temperatures.

FREDERICK PYNE LENARD.
GEOFFREY WILLIAM METHVEN.

References Cited in the file of this patent

UNITED STATES PATENTS

| Number | Name | Date |
|---|---|---|
| 1,862,301 | Drexler | June 7, 1932 |
| 1,994,050 | Satow | Mar. 12, 1935 |
| 2,141,313 | Osgood et al. | Dec. 27, 1938 |
| 2,262,770 | Lapiana | Nov. 18, 1941 |
| 2,285,053 | Rojas | June 2, 1942 |
| 2,320,764 | Ullrich | June 1, 1943 |
| 2,337,656 | Haycock | Dec. 28, 1943 |
| 2,381,460 | Meyer | Aug. 7, 1945 |
| 2,403,995 | Peters | July 16, 1946 |
| 2,443,197 | Rhodes | June 15, 1948 |
| 2,444,314 | Ruggueri | June 29, 1948 |
| 2,568,463 | Reynolds | Sept. 18, 1951 |